(12) United States Patent
Imhof et al.

(10) Patent No.: US 12,151,500 B2
(45) Date of Patent: Nov. 26, 2024

(54) OPTICALLY VARIABLE SECURITY ELEMENT

(71) Applicant: GIESECKE+DEVRIENT CURRENCY TECHNOLOGY GMBH, Munich (DE)

(72) Inventors: Martin Imhof, Munich (DE); Astrid Heine, Kirchheim (DE); Raphael Dehmel, Neubeuern (DE); Andrea Hofstetter, Schweitenkirchen (DE)

(73) Assignee: GIESECK+DEVRIENT CURRENCY TECHNOLOGY GMBH, Munich (DE)

( * ) Notice: Subject to any disclaimer, the term of this patent is extended or adjusted under 35 U.S.C. 154(b) by 331 days.

(21) Appl. No.: 17/414,701

(22) PCT Filed: Dec. 19, 2019

(86) PCT No.: PCT/EP2019/000354
§ 371 (c)(1),
(2) Date: Jun. 16, 2021

(87) PCT Pub. No.: WO2020/126072
PCT Pub. Date: Jun. 25, 2020

(65) Prior Publication Data
US 2022/0063318 A1 Mar. 3, 2022

(30) Foreign Application Priority Data
Dec. 20, 2018 (DE) .................... 10 2018 010 078.3

(51) Int. Cl.
B42D 25/324 (2014.01)
B42D 25/29 (2014.01)
(Continued)

(52) U.S. Cl.
CPC ......... *B42D 25/324* (2014.10); *B42D 25/425* (2014.10); *G02B 5/085* (2013.01); *G02B 5/09* (2013.01); *B42D 25/29* (2014.10)

(58) Field of Classification Search
CPC .... B42D 25/324; B42D 25/425; B42D 25/29; B42D 25/328; G02B 5/085; G02B 5/09; G02B 5/08
(Continued)

(56) References Cited

U.S. PATENT DOCUMENTS 5,772,249 A 6/1998 Guex et al.
6,909,547 B2 6/2005 Weiteneder et al.
(Continued)

FOREIGN PATENT DOCUMENTS

CA 2421501 A1 3/2003
CN 1452561 A 10/2003
(Continued)

OTHER PUBLICATIONS

Chinese Search Report from corresponding Chinese Application No. 201980088743X, Dec. 18, 2021.
(Continued)

*Primary Examiner* — Justin V Lewis
(74) *Attorney, Agent, or Firm* — Workman Nydegger

(57) ABSTRACT

An optically variable security element for securing valuable articles, has a relief grid having a plurality of relief elements arranged in a grid pattern and at least one line grid arranged vertically above or below the relief grid and having a plurality of line elements that run substantially in the same direction and that are location-dependently modulated. The relief grid and the at least one line grid coact to produce for a viewer, through the location-dependent modulation of the line elements, a surface that, with respect to the area of the
(Continued)

security element, jumps out and/or back in the form of a specified three-dimensional image motif.

26 Claims, 4 Drawing Sheets

(51) Int. Cl.
*B42D 25/328* (2014.01)
*B42D 25/425* (2014.01)
*G02B 5/08* (2006.01)
*G02B 5/09* (2006.01)

(58) Field of Classification Search
USPC .................. 283/72, 74, 91, 94, 98, 901
See application file for complete search history.

(56) References Cited

U.S. PATENT DOCUMENTS

| | | | |
|---|---|---|---|
| 7,377,444 B2 | 5/2008 | Franz et al. | |
| 7,686,341 B2 | 3/2010 | Adamczyk et al. | |
| 8,400,495 B2 | 3/2013 | Kaule | |
| 8,878,844 B2 | 11/2014 | Kaule et al. | |
| 9,176,266 B2 | 11/2015 | Fuhse et al. | |
| 9,459,385 B2 | 10/2016 | Brehm et al. | |
| 9,827,802 B2 | 11/2017 | Fuhse et al. | |
| 10,525,758 B2 | 1/2020 | Fuhse et al. | |
| 10,525,759 B2 | 1/2020 | Rahm et al. | |
| 10,792,947 B2 | 10/2020 | Tashiro et al. | |
| 10,870,305 B2 | 12/2020 | Fuhse et al. | |
| 10,882,351 B2 | 1/2021 | Walter et al. | |
| 2005/0030626 A1 | 2/2005 | Weiteneder et al. | |
| 2006/0163361 A1 | 7/2006 | Franz et al. | |
| 2008/0258456 A1 | 10/2008 | Rahm et al. | |
| 2008/0284157 A1* | 11/2008 | Muke .................. | B42D 25/43 283/86 |
| 2008/0290647 A1 | 11/2008 | Adamczyk et al. | |
| 2010/0177094 A1 | 7/2010 | Kaule et al. | |
| 2010/0208036 A1* | 8/2010 | Kaule .................. | B44F 1/10 700/118 |
| 2012/0319395 A1 | 12/2012 | Fuhse et al. | |
| 2013/0093172 A1 | 4/2013 | Fuhse et al. | |
| 2013/0099474 A1 | 4/2013 | Fuhse et al. | |
| 2014/0177057 A1 | 6/2014 | Brehm et al. | |
| 2014/0247499 A1 | 9/2014 | Doublet et al. | |
| 2017/0326900 A1 | 11/2017 | Fuhse et al. | |
| 2017/0368864 A1 | 12/2017 | Walter et al. | |
| 2018/0001690 A1 | 1/2018 | Fuhse et al. | |
| 2020/0086674 A1 | 3/2020 | Tashiro et al. | |
| 2020/0223243 A1 | 7/2020 | Petiton et al. | |
| 2021/0070088 A1 | 3/2021 | Fuhse et al. | |

FOREIGN PATENT DOCUMENTS

| | | |
|---|---|---|
| CN | 107107649 A | 8/2017 |
| CN | 108025584 A | 5/2018 |
| DE | 102005061749 A1 | 7/2007 |
| DE | 102010025775 A1 | 1/2012 |
| DE | 102011102999 A1 | 11/2012 |
| DE | 102016007784 A1 | 12/2017 |
| EP | 1554700 B1 | 1/2007 |
| EP | 1765602 B1 | 6/2008 |
| EP | 1894170 B1 | 3/2009 |
| FR | 3000112 A1 | 6/2014 |
| FR | 3066954 A1 | 12/2018 |
| KR | 20040088468 A | 10/2004 |
| WO | 2004020217 A1 | 3/2004 |
| WO | 2007149692 A2 | 12/2007 |
| WO | 2009000527 A1 | 12/2008 |
| WO | 2011066990 A2 | 6/2011 |
| WO | 2011066991 A2 | 6/2011 |
| WO | 2012084169 A1 | 6/2012 |
| WO | 2016020066 A2 | 2/2016 |
| WO | 2016113220 A1 | 7/2016 |
| WO | 2017011476 A1 | 1/2017 |
| WO | 2017217911 A1 | 12/2017 |
| WO | 2017220204 A1 | 12/2017 |
| WO | 2018225801 A1 | 12/2018 |

OTHER PUBLICATIONS

Search Report from German Application No. 102018010078.3, Aug. 8, 2019.
International Search Report and Written Opinion from PCT Application No. PCT/EP2019/000354, Apr. 14, 2020.

* cited by examiner

OPTICALLY VARIABLE SECURITY ELEMENT

BACKGROUND

The present invention relates to an optically variable security element for securing valuable articles, as well as a data carrier that is furnished accordingly.

For protection, data carriers, such as value or identification documents, or other valuable articles, such as branded articles and packaging or secondary packaging of valuable branded articles, are often provided with security elements that permit the authenticity of the data carriers to be verified, and that simultaneously serve as protection against unauthorized reproduction.

Security elements having viewing-angle-dependent effects play a special role in safeguarding authenticity, as said security elements cannot be reproduced even with the most modern copiers. Here, the security elements are furnished with optically variable elements that, from different viewing angles, convey to the viewer a different image impression and, depending on the viewing angle, display for example a different color or brightness impression and/or a different graphic motif.

SUMMARY

Proceeding from this, the object of the present invention is to specify a security element of the kind cited above having an attractive appearance and high counterfeit security.

The present invention provides an optically variable security element for securing valuable articles, having a relief grid having a plurality of relief elements arranged in a grid pattern and at least one line grid arranged vertically above or below the relief grid and having a plurality of line elements that run substantially in the same direction and that are location-dependently modulated, the relief grid and the at least one line grid coacting to produce for a viewer, through the location-dependent modulation of the line elements, a surface that, with respect to the area of the security element, jumps out and/or back in the form of a specified three-dimensional image motif.

Below, for the sake of simplicity, often only "the line grid" is mentioned instead of "the at least one line grid", but it is understood that this is done only for easier reference and is not in-tended to exclude the presence of more than one line grid. The statements made then apply in each case for at least one, preferably even for all line grids in the security element.

In a first advantageous variant of the present invention, it is provided that the relief grid is a one-or two-dimensional relief grid composed of a plurality of grid elements, which relief grid has, in at least one spatial direction, a first grid spacing p below 500 µm, and in which the grid elements are each formed from at least two relief elements that are directionally reflective in different directions, the at least one line grid having a second grid spacing q in said spatial direction, the second grid spacing q differing at most slightly from the first grid spacing p, especially by less than one-fifth, and/or the first grid spacing p and/or the second grid spacing q being location-dependently modulated, and the vertical spacing between the relief grid and the line grid being less than half of the grid spacing p, preferably less than one-fifth of the grid spacing p, particularly preferably less than one-tenth of the grid spacing p, especially less than 15 µm.

The grid spacing p is advantageously even smaller than 400 µm and, in one advantageous embodiment, is between 200 µm and 400 µm, in another advantageous embodiment, between 40 µm and 200 µm. The line grid advantageously includes a plurality of lines whose width is less than half of the grid spacing q and is especially between 5 µm and 200 µm. The line width is particularly preferably between 10 µm and 150 µm and especially between 50 µm and 120 µm. In printing, line widths down to 8 µm are easily implementable on smooth substrates. Advantageously, the line width can also be chosen depending on the number of colors in the line grid, for example a line width of 95 µm for two colors and a line width of 145 µm for three colors. In some printing stock and printing processes, for example in dry offset, line widths between 10 µm and 30 µm are preferred.

In one advantageous embodiment, at least one line grid is a print line grid that preferably is formed at least in a sub-region from a plurality of substantially parallel print lines having a spacing q. The sub-region can be formed in the form of a pattern, characters or a code. The print lines can especially be printed with a translucent ink to ensure a partial translucence of the line grid.

The relief elements of the relief grid are advantageously provided with a reflection-increasing coating, especially a metalization. The coating can be opaque, but also semitransparent or even largely translucent, and then consist, for example, of a high-index layer composed of HRI (high-refractive-index) materials, for example composed of $TiO_2$ or ZnS.

In one advantageous embodiment, the relief grid is a one-dimensional grid composed of a plurality of elongated grid elements that has said grid spacing p. Here, the grid elements are each advantageously composed of at least two line-type relief elements that are directionally reflective in different directions. In particular, the grid elements are each formed from a plurality of line-type micromirrors, from a cylindrical Fresnel mirror structure or from other, preferably achromatically reflective diffractive structures.

In another, likewise advantageous embodiment, the relief grid is a two-dimensional grid composed of a plurality of grid elements that has said grid spacing p in a first spatial direction. The grid elements of a two-dimensional grid are advantageously each formed from at least two, preferably at least three, particularly preferably at least four, and for example six, relief elements that are each directionally reflective in different directions and are especially each formed from a circular or elliptical arrangement of a plurality of micromirrors, from a spherical or elliptical Fresnel mirror structure or from other, preferably achromatically reflective diffractive structures.

The reflective relief elements especially comprise one or more reflection areas that can be planar or curved, the relief elements in the former case typically being referred to as micro-mirrors, while in the latter case, they typically form a zone of a Fresnel mirror structure. Here, the reflective relief elements of each grid element are advantageously arranged and developed in such a way that the grid element produces the reflection behavior of a concave or convex curvature. For this, the individual relief elements can be arranged, for example, next to one another with increasing or decreasing slope of their reflection area(s) such that, in each case, they locally reproduce the slope of a concave or convex curvature. In two-dimensional relief grids, the slopes of the reflection areas can reproduce a concave or convex curvature in two spatial directions. Alternatively, the slopes of the reflection areas reproduce a concave or convex curvature only in one spatial direction, while they are oriented irregularly or randomly in the other spatial direction.

The relief grid can occupy the entire area of the security element, but can also be present only in sub-regions of the security element, especially in the form of patterns, characters or a code.

According to one preferred development of the present invention, the first and/or second grid spacing is location-dependently modulated in that the positions of the grid elements of the relief grid or of the line grid are given by a phase function (x,y) that depends on the position (x,y) of the grid element in the security element and whose function value indicates the deviation of the position of the grid element in a spatial direction from the position of a grid point in a regular grid, normalized to the unit interval [0,1], and the phase function (x,y) varying location dependently in such a way that, when viewed, the surface that, with respect to the area of the security element, jumps out and/or back in the form of the specified three-dimensional image motif is created.

Further advantageous embodiments of the relief grid and of the at least one line grid can be found in document WO 2017/220204 A1, the disclosure of which is incorporated in the present application by reference.

In a second advantageous variant of the present invention, it is provided that the security element includes an optically variable structure having an embossing structure and a coating, the coating comprising an imprinted line grid and advantageously, in addition, a highly reflective or glossy background layer, the imprinted line grid being formed by said line grid having the plurality of line elements that run substantially in the same direction and that are location-dependently modulated, the embossing structure comprising a two-dimensional grid of elevated or depressed embossing elements, the embossing structure forming said relief grid and the embossing elements forming said relief elements, the coating and the embossing structure being combined in such a way that substantially on every embossing element lies at least one line segment of a line in the line grid, and at least one of the parameters 'position of the line segment on the embossing element,' 'orientation of the line segment on the embossing element' and 'form of the line segment' varying location dependently across the dimension of the optically variable structure such that, when viewed, the surface that, with respect to the area of the security element, jumps out and/or back in the form of a specified three-dimensional image motif is created.

In the present application, said highly reflective or glossy background layer constitutes an additional layer that is applied on a substrate of the security element and is not formed only by the surface of the substrate itself.

In the case of the presence of a highly reflective background layer, said layer is advantageously formed by a metallically glossy foil, especially a silver, bronze, copper, gold or metallic foil, or by a metallically glossy printing layer, especially a silver print layer, but also other metalized foil strips or patches may be used as the background layer. The metallically glossy printing layer can especially be applied in screen printing or flexo printing, or also as a UV-curing offset ink. The effects described are particularly well visible when a directionally reflective background layer having a high gloss value is used. Due to the highly reflective background layer, each embossing element advantageously acts as a small concave or convex mirror.

In the case of the presence of a glossy background layer, said layer can, for example, be formed by a subsequent surface treatment of a substrate, e.g. a lacquering of the substrate in the printing process, or by a high-gloss surface layer of a packaging.

In one advantageous embodiment without a background layer, in which a background that contrasts with the imprinted line grid is formed by the surface of the substrate itself, said background can be produced, for example, at paper manufacturing, for instance by smoothing the substrate, and can especially be formed by calendered paper, coated paper and/or densified paper (thickness change e.g. <20% compared with non-densified paper) having increased filler content or by paper that has an increased reflection factor e.g. due to an increased white or titanium dioxide content.

Calendered paper has a significantly higher gloss value compared with uncalendered paper. For example, the gloss value of calendered cotton vellum paper is, on average around 9, measured in accordance with DIN EN ISO 2813, DIN 54502, DIN EN ISO 8254-1, EN ISO 8254-2, compared with an average gloss value of about 3 for uncalendered cotton vellum paper.

In advantageous embodiments, the embossing elements are formed by elevated or depressed round structures, especially by compressed hemispherical structures or calottes. The base area of the embossing elements is preferably circular or elliptical. In addition, also pyramidal forms, especially having a high number of faces, for example an octagonal base, may be used. Also embossing elements of different forms can be present in an embossing structure to further increase the counterfeit security.

The dimension of the embossing elements is preferably in the range from 50 µm to 500 µm, with the dimension in advantageous first embodiments being between 50 µm and 200 µm, and in advantageous second embodiments, between 250 µm and 300 µm. The structure height is advantageously below 200 µm, preferably below 150 µm, particularly preferably in the range from 20 µm to 110 µm. The structure height is, in advantageous first embodiments, between 20 µm and 30 µm, in advantageous second embodiments, between 50 µm and 70 µm, and in advantageous third embodiments, between 90 µm and 110 µm.

The embossing elements are preferably arranged in a square lattice, rectangular lattice, rhombus lattice, hexagonal lattice or parallelogram lattice.

The position of a line segment on an embossing element is advantageously given in each case by a phase function (x,y) that depends on the position (x,y) of the embossing element in the optically variable pattern and whose function value specifies the relative position of the line segment on the embossing element perpendicular to the longitudinal dimension of the line segment, normalized to the unit interval [0,1]. Here, the phase function $\Phi$ (x,y) varies location dependently in such a way that, when viewed, the surface that, with respect to the area of the security element, jumps out and/or back in the form of a specified three-dimensional image motif is created.

The line widths of the printed line grids are preferably in the range from 10 µm to 200 µm, preferably in the range from 45 µm to 150 µm and particularly preferably in the range from 80 µm to 150 µm. The printed lines can have a constant line width or the line width can change along the longitudinal dimension of the lines, especially expand, shrink or be modulated on one or two sides.

Further advantageous embodiments of the relief grid and of the line grid can be found in document WO 2016/020066 A2, the disclosure of which is incorporated in the present application by reference.

In both variants of the present invention, two or more line grids arranged vertically above or below the relief grid can advantageously be provided, the lines of different line grids preferably being applied with different inks. In particular, the lines of a first line grid can be applied with a lighter, preferably translucent ink, and the lines of a second line grid, with a darker, preferably covering ink. The line grids that run substantially in the same direction each have a preferred direction defined by the line direction, the preferred directions of the two or more line grids together advantageously including an angle of 0°, 60°, 90°, 120° or 240°. In a quadratic arrangement of the embossing elements, the preferred directions are especially parallel (0°) or perpendicular (90°) to each other. In the case of a hexagonal honeycomb arrangement, the preferred directions especially include an angle of +/−60° or +/−120°.

It can advantageously be further provided that the relief grid and the at least one line grid coact to produce, through the location-dependent modulation of the line elements, a change in brightness and/or change in color of the three-dimensional image motif when the viewing angle is changed. The relief grid and the at least one line grid can further advantageously coact to produce, through the location-dependent modulation of the line elements, an apparent movement of sub-regions of the three-dimensional image motif or a change in the perspective appearance of the three-dimensional image motif when the viewing angle is changed.

Particularly advantageously, the security element depicts a combination of multiple, especially moving, three-dimensional image motifs in order to more strongly direct the attention of the viewer to the movement, or to strengthen the movement impression itself, for example through an opposing movement of two three-dimensional image motifs. A combination of multiple moving three-dimensional image motifs can especially be realized through the above-described technique with a further print motif in the region of the relief grid. For example, different line grids can, through their line modulation (for example thickness and/or position dependent), produce the impression of a movement of two three-dimensional objects relative to each other in different depth planes.

Said combination of multiple, preferably moving, three-dimensional image motifs can also be realized through a combination of different techniques, for example in that, in addition to the coacting relief and line grid, a three-dimensional hologram, for example having a pumping movement, is provided on the security element. Such a three-dimensional image motif produced with a different technique is advantageously associated in meaning with the three-dimensional image motif produced by the coacting relief and line grid. The two motifs particularly preferably form motif portions of a complete motif that are related to, that complement or that explain one another. The motifs can also be related to one another through their movement pattern, for example in that, when the viewing angle is changed, they display the same movement pattern or move opposite to one another.

In one advantageous development, to accentuate a movement or an object contour, the relief grid of the security element comprises a first and a second sub-region, the two sub-regions each being optically perceptible as jumping out and/or back and each of the two sub-regions conveying a haptically detectable impression. Here, in the first sub-region, it is provided that the optically perceptible and the haptically detectable impression of the sub-region match, while in the second sub-region, the optically perceptible and the haptically detectable impression do not match.

On one hand, the security element is therefore optically very attractive due to the sub-regions that optically that jump out and/or back. On the other hand, a surprising effect results due to the haptically detectable impression matching with the optically perceptible impression only for the first sub-region but not for the second sub-region. Such a variation in the haptic and thus tactile perception of a motif produces a high recognition value and contributes to easy verifiability of the authenticity of the optically variable element. Further details and specific embodiments of said first and second sub-regions can be found in document WO 2012/084169 A1, the disclosure of which is incorporated in the present disclosure by reference.

The security element is advantageously a wide security band, a security strip, a patch or a label for application to a security paper, value document or the like, but it can also constitute a security thread, especially a window security thread or a pendulum security thread, or a tear strip.

The present invention also includes a data carrier having a security element of the kind described. The data carrier can especially be a value document, such as a banknote, especially a paper banknote, a polymer banknote or a foil composite banknote, a stock, a tax stamp, a bond, a certificate, a voucher, a check, a valuable admission ticket, but also an identification card, such as a credit card, a bank card, a cash card, an authorization card, a personal identity card or a pass-port personalization page. Finally, the present invention also includes an object, especially a branded article or the (secondary) packaging of a branded article having a security element of the kind described.

The security element according to the present invention can especially be manufactured according to the method specified in documents WO 2017/220204 A1 and WO 2016/020066 A2. In addition, especially intaglio printing, offset printing, screen printing, foil application, printing on foils and 3D printing of relief structures may be used as printing or application methods.

BRIEF DESCRIPTION OF THE DRAWINGS

Further exemplary embodiments and advantages of the present invention are explained below by reference to the drawings, in which a depiction to scale and proportion was dispensed with in order to improve their clarity.
Shown are.

DETAILED DESCRIPTION OF VARIOUS EMBODIMENTS

Figure 1:
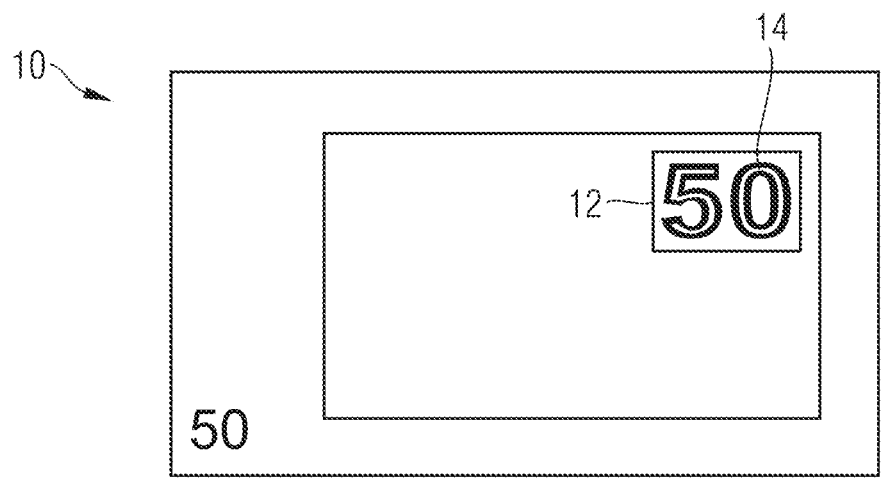
FIG. 1 a schematic diagram of a banknote having an optically variable security element according to the present invention, FIG. 2 to illustrate the fundamental operating principle, schematically, a sub-region of a security element according to the present invention, in cross section, and the curved area perceived by the viewer when viewed, FIG. 3 an enlarged depiction of one of the grid elements of the security element in FIG. 2, FIG. 4 a top view of a line grid as can be used for the security element in FIG. 2, FIG. 5 a three-dimensional "snail shell" image motif whose spatial impression is reconstructed when the line grid in FIG. 4 is used, along with two vertical sections of the image motif in the x— and y-direction, respectively, FIG. 6 schematically, a top view of a detailed section of a security element having a two-dimensional relief grid and two differently oriented line grids, FIG. 7 a top view of a line grid as can be used for a security element according to FIG. 6, FIG. 8 a top view of a section of a further security element according to the present invention, and FIG. 9 a cross section through the security element in FIG. 8 along the line IX-IX.

The invention will now be explained using the example of security elements for banknotes. For this, FIG. 1 shows a schematic diagram of a banknote 10 that is provided with an inventive optically variable security element 12. When viewed, the security element 12 displays a three-dimensional image motif having a surface, in the form of a value numeral 14, that jumps out with respect to the area of the security element 12 and that apparently protrudes, curved, from the security element or the banknote furnished therewith.

Figure 2:
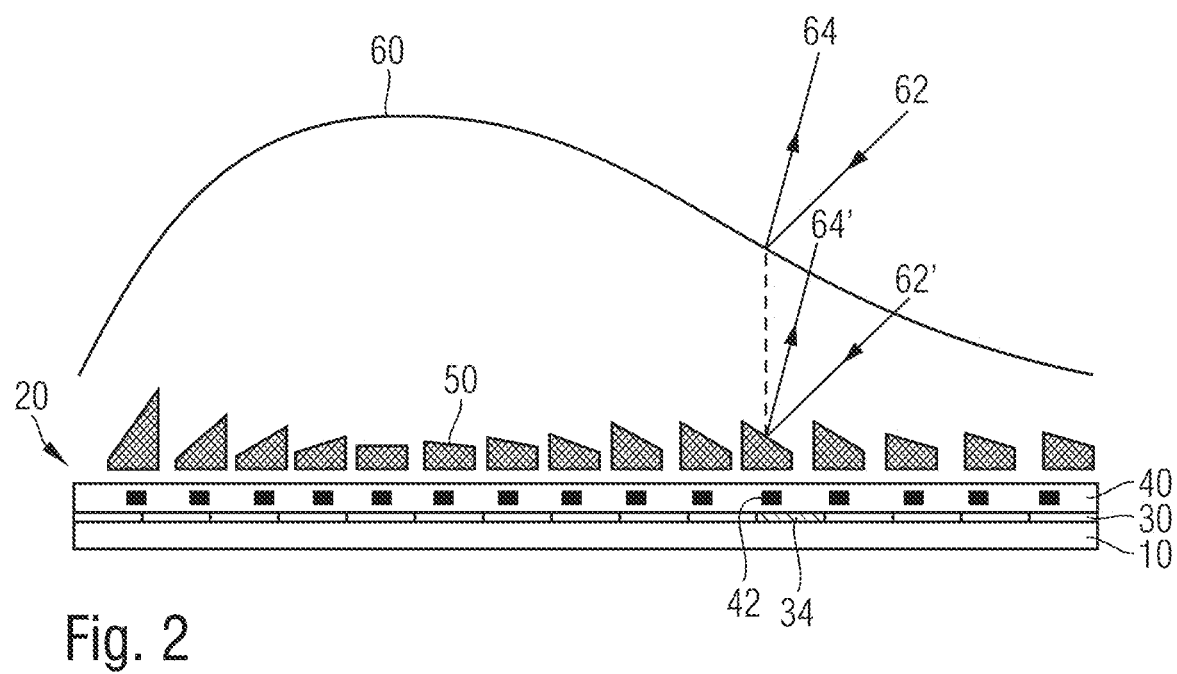
Figure 3:
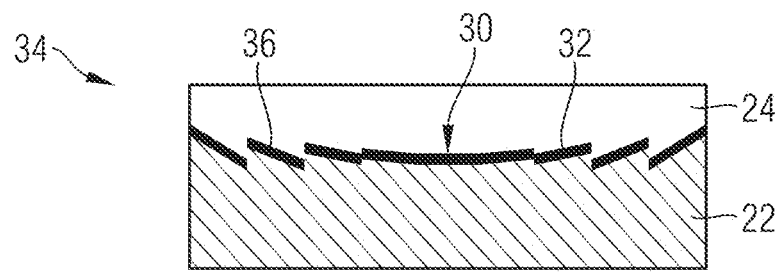

The basic structure and the fundamental operating principle of an optically variable security element 20 according to the present invention, such as the security element 12 in FIG. 1, will now be explained in greater detail with reference to FIGS. 2 and 3, FIG. 2 showing schematically in cross section a sub-region of the security element 20 and the curved area 60 perceived by the viewer upon viewing the security element 20.

The security element 20 is applied on a banknote substrate 10 by means of an adhesive layer 22 that is best recognizable in the detailed section in FIG. 3. The security element 20 includes an embossing lacquer layer 24 in which is embossed a relief grid 30 that, prior to the application of the adhesive layer 22, was furnished with a metalization 32, for example composed of aluminum or silver. In the exemplary embodiment, the relief grid 30 itself consists of a plurality of elongated grid elements 34 of the same kind that connect to one another in the transverse direction and whose longitudinal axis extends, in the diagram in FIG. 2, into the plane of projection such that, for example, a rectangular relief grid consisting of 50×100 grid elements results. For illustration, one of the grid elements 34 is depicted enlarged in cross section in FIG. 3.

Each grid element 34 consists of multiple parallel, line-like micromirrors 36 whose mirror slope in the figure changes, in each case from the left edge to the right edge of the grid element, almost continuously from a first, negative slope (running from top left to bottom right in the figure) to a second, positive slope (running from bottom left to top right). In this way, the micro-mirrors 36 of each grid element 34 simulate the reflection behavior of a parabolic concave mirror. Here, the term "line-like" refers to the elongated extension of the micromirrors 36 into the plane of projection. Here, the reflective areas of the micromirrors can be planar areas, symmetric and asymmetric, or also concavely or convexly curved areas.

Returning to the diagram in FIG. 2, there is arranged vertically above the relief grid 30 a line grid 40 having a plurality of print lines 42 that run substantially in the same direction, that are location-dependently modulated, and that are imprinted with a translucent or opaque printing ink. Due to the location-dependent modulation, the print lines 42 are largely, but not completely, parallel (see FIG. 4) and are therefore referred to as running substantially in the same direction. The print lines 42 differ in their pattern repeat, and also a large offset of the lines 42 can occur in local regions 48.

Like the longitudinal axis of the grid elements 34, the longitudinal axis of the print lines 42 in FIG. 2 likewise runs into the plane of projection. Further, the relative lateral position of the print lines 42 with respect to the arrangement of the grid elements 34 is not fixed, but rather varies due to the modulation of the print lines 42 across the area of the security element 20. Although there is assigned to substantially each grid element 34 a print line 42 that lies above each said grid element, the relative lateral position of the grid element 34 and the print line 42 varies, as depicted schematically in FIG. 2.

The print lines 42 and the micromirrors 36 of a grid element 34 coact to produce, in each case, a moiré-magnified likeness 50 of a sub-region of the grid elements 34. Here, each likeness 50 constitutes the contribution of the respective overprinted grid element 34, 42 to the complete curved area 60. As a distinctive feature, the location-dependent modulation of the print lines 42 is now coordinated with the position of the micromirrors 36 of the relief grid 30 in just such a way that, locally, the moiré-magnified images 50 have in each case the same orientation as the curved area 60 that is to be depicted by the security element. Since the slope of the micromirrors 36 within a grid element 34 changes quasi-continuously, in each case from the left edge to the right edge, through a suitable positioning of a print line 42 relative to the associated grid element 34, a moiré-magnified image having a practically arbitrary slope within the slope range specified by the grid element can be produced. Here, the viewing angle of the subsequent moiré image 60 can be visualized through different slopes of the elements 50.

For a given relief grid 30, the position and slope of all micromirrors 36 are known. To replicate a desired curved area 60, as described in greater detail below, the local slope of the area 60 is then determined in each case and the relative position of the print lines 42 in each grid element 34 is chosen in such a way that the grid element together with the associated print line element produces a moiré-magnified image of the same slope. Since, for the reflection of incident light 62, 62', the geometric reflection condition "angle of incidence is equal to angle of reflection" depends in each case only on the local orientation of the reflective areas 50 and 60, in the reflected light 64, 64', the moiré-magnified images 50 taken together can easily imitate the curved area 60 to be depicted. The security element 20 thus has an optical impression that corresponds to a three-dimensional object whose surface is given by the curved area 60.

In the exemplary embodiment in FIGS. 2 and 3, the effects are illustrated in a one-dimensional relief grid composed of elongated grid elements 34, but the principle according to the present invention can be realized in the same way with two-dimensional relief grids. Further, for the sake of simplicity, FIGS. 2 and 3 show a relief grid 30 having a constant grid spacing, but the effects can also be realized with relief grids of variable grid spacing.

In the exemplary embodiment shown, the dimension of the grid elements 34 in the transverse direction, which simultaneously constitutes the grid spacing p of the relief grid 30, is p=200 μm. The dimension of the grid elements 34 and of the micromirrors 36 in the longitudinal direction, that is, into the paper plane in FIG. 2, can be several millimeters or even centimeters, that is, is significantly larger than the grid spacing.

The grid spacings of the relief grid 30 and of the line grid 40 are of similar size and differ, for example, by about 5% to 15%. In the exemplary embodiment, the line width of the print lines 42 is considerably smaller than the average grid spacing of the line grid 40. Due to the superimposition of the relief grid and the line grid, the viewer sees in each case two different reflexes, namely a white/silver-colored reflex from the uncovered region of the relief grid 30 and a colored reflex from the regions that are covered with the translucent printing ink of the print lines 42. Since the print lines 42 are considerably narrower than the grid elements 34, the colored reflex is visible across a relatively small angle range, while the white/silver-colored reflex is fanned out further.

Also the reverse situation can be advantageous, in which the line widths of the print lines 42 are only a little smaller than the average grid spacing of the line grid 40. In this case, the white/silver-colored reflex is visible across a relatively small angle range, while the colored reflex of the translucent print lines 42 is fanned out further.

The line grid 40 particularly advantageously comprises two or more print lines having different hues, especially at least one lighter, luminous hue and a darker hue being used. The lighter color can also be fluorescent or phosphorescent, and as the darker hue, especially red, blue, green or black or a secondary mixed color may be used. In addition to a light-dark contrast, also a warm-cold contrast or a quality contrast can be produced through the different hues. Also combinations of a light-dark contrast and a warm-cold contrast are possible (e.g. a light blue or cold hue with a dark red or warm hue). Together, the print lines can cover the entire area of the relief structure such that a color impression is produced for each viewing direction. In this case, at least one print line type is printed with a sheer, translucent color.

The combination of an absorbent covering dark color and a translucent light color has proven to be particularly advantageous. The print lines composed of covering and translucent color can leave an unprinted space uncovered or can be applied over the entire area. Here, it is further advantageous when as great a difference as possible in the chromaticity, brightness and/or saturation exists between the two colors, such that as great a contrast as possible is created.

Figure 4:
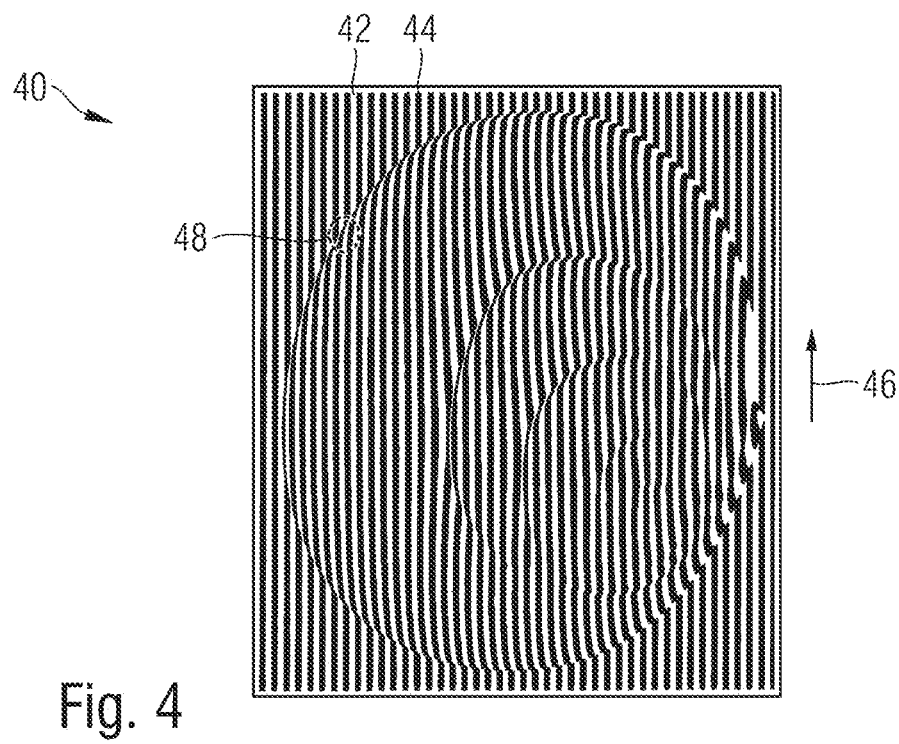
Figure 5:
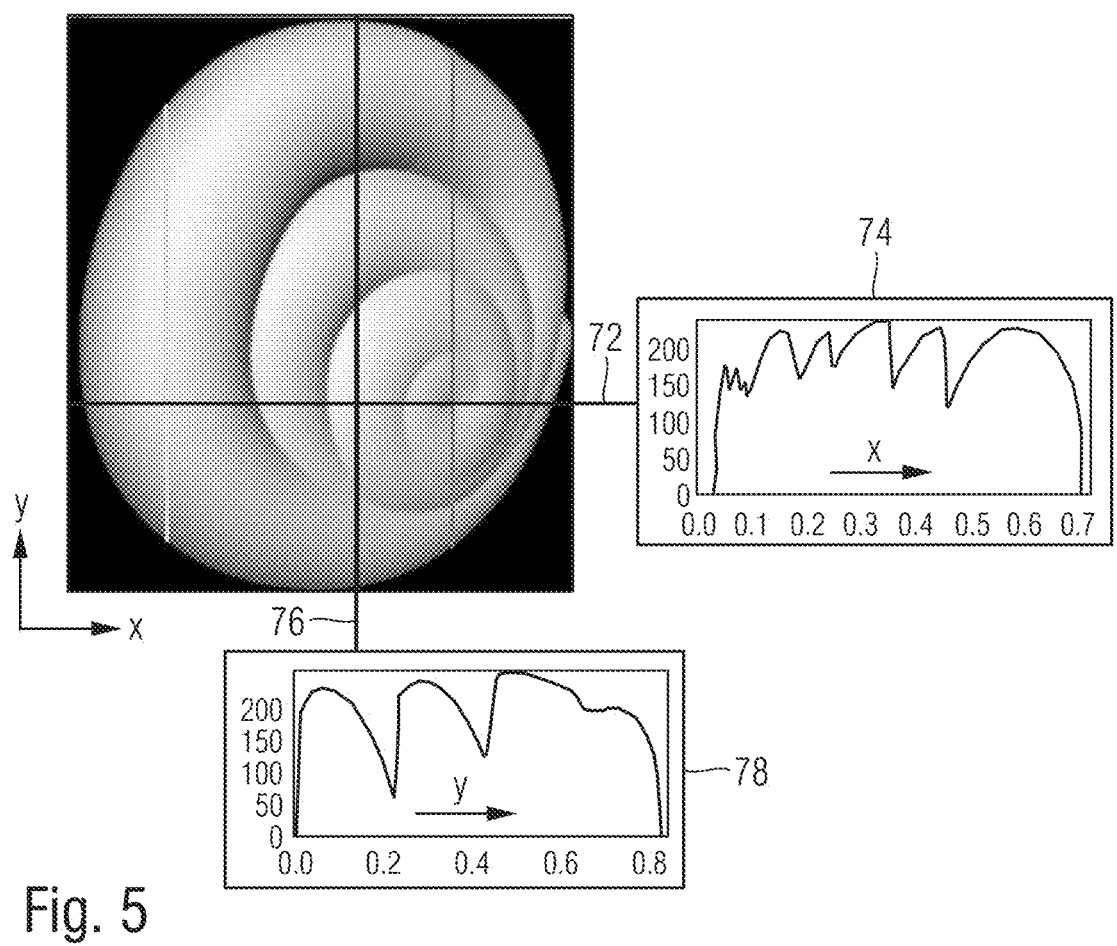

FIG. 4 shows a top view of a line grid 40 as can be used for the security element 20 in FIG. 2 and that produces the three-dimensional impression of a snail shell (FIG. 5). The line grid includes a plurality of light print lines 42 that are printed, for example, with a yellow translucent printing ink, and a plurality of dark print lines 44 that are printed, for example, with a covering blue printing ink. Although the print lines 42, 44 all run substantially in the same direction in direction 46, it is well perceptible that the print lines have a modulation that is particularly well visible at the locations 48, at which the slope of the depicted spatial object quickly changes.

For illustration, FIG. 5 shows the three-dimensional "snail shell" image motif 70, whose spatial impression is reconstructed by the security element 20 when the line grid 40 in FIG. 4 is used. A surface function f (x,y) that indicates in each case the height or the z coordinate of the image motif 70 as a function of the location (x,y) forms the height relief of the image motif 70. The graphs 74, 78 show, by way of example, two vertical sections along the lines 72 and 76, respectively, in which the function value f (x,y), that is, the height of the image motif, is plotted in arbitrary units above the location coordinate x (graph 74) and the location coordinate y (graph 78). The courses of the function can be represented, for example, as higher-order polynomial functions.

Based on the surface function f (x,y) of the image motif to be depicted, the local slope in the image motif is determined and then, for the different slopes, using a suitable software or programming language (e.g. GDL (GNU Data Language), IDL (Interactive Data Language), Maple (mathematical manipulation language), C++, Visual Script, Modelica, Mathematica, MATLAB (Mathworks), AutoCAD), a phase change is calculated in each case for the line pattern, composed of print lines 42, to be printed, the phase change indicating in each case the position of a print line section relative to the associated grid element 34. The locally different slopes of the image motif 70 and thus of the surface function f (x,y) result in different phase changes of the print line sections and thus produce the above-mentioned location-dependent modulation of the print lines 42.

As depicted in FIG. 4, locally, the course of the print lines 42, 44 can deviate greatly from the principally parallel course, the lines can run obliquely or even change discontinuously (regions 48), which, in extreme cases, can result in some grid elements 34 not being overprinted at all or not completely by a print line 42 or also a print line 44.

With the technique described in FIGS. 2 and 3, also dynamic line and dot motifs can be implemented in which a desired pattern composed of lines and/or dots appears to float above the substrate plane. For this, the print line grid is chosen in such a way that adjacent regions that re-fleet in color, or the associated adjacent moiré-magnified images 50, have a course of the angle of reflection that imitates a continuous course. Said course can especially be chosen in such a way that a colored light reflex is visible at slightly different locations for the two eyes of the viewer. Due to this stereoscopic effect, the lines or dots appear to float above or below the substrate plane and a spatial effect is created.

Said technique also permits a multicolored three-dimensional depiction of objects that, when viewed from different viewing directions, have different color nuances and/or different relative movement speeds. Here, the color nuances need not correspond to the natural coloring of the depicted object and, in this way, can draw particularly high attention at verification. It is also possible to systematically speed up or slow down the movement speed of a chromatic shading along the depicted object to direct increased attention to the security element.

The depicted spatial object advantageously undergoes a change in brightness or change in color in different regions when the viewing angle is changed. Here, regions of the three-dimensional object can apparently move relative to one another or change their perspective appearance. In a pump depiction, also a local change in the pump speed can be produced.

The intensity of the line modulation can strengthen the spatial impression of a three-dimensional object, that is, produce a stronger depth effect and stronger plasticity, or conversely, also weaken and produce a slight depth effect and slight plasticity. In this way, spatial objects having a realistic effect can be generated according to shape and size. In particular, by combining multiple 3-D objects in one security element, through line modulation (for example thickness and/or position dependently), a movement of two objects relative to one another in different depth planes can be produced. For instance, the impression of a ball (first 3-D object) can be produced that, in the foreground, appears to roll back and forth (relative movement of the two 3-D objects) in front of a chess board (second 3D-object) depicted in perspective.

The spatial objects depictable according to the present invention can be simple geometric structures, such as spherical, cubic, cuboid, conical, cylindrical, pyramidal, prismatic objects, but also truncated and distorted elements. Also more complex shapes, such as toroidal, globular or icosahedral objects are possible. Furthermore, also animals, plants or objects of everyday life are depictable, such as the snail shell depicted in FIG. 5.

The surface function f (x,y) of the image motif to be depicted is advantageously not constant and symmetric, it further advantageously includes a course that is convex, concave or also linear, but that is not linear in the xy-direction, but only in the x- or y-direction. The surface function is preferably also not periodic across the entire course of the object. Spatial image motifs having a varying curvature can be depicted particularly well.

In addition to one-dimensional relief grids, especially also designs having two-dimensional relief grids and having two or more differently oriented line grids may be used, as now explained with reference to FIGS. 6 and 7.

Figure 6:
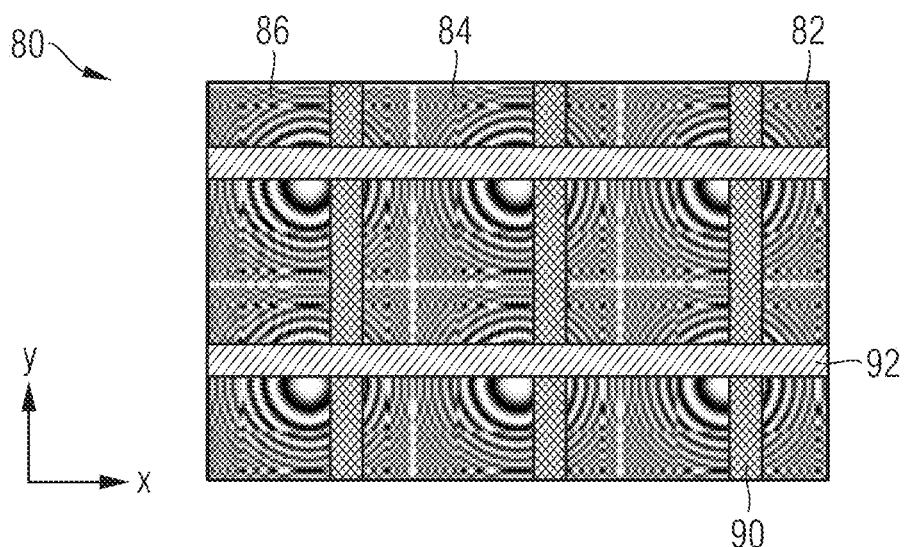

First, FIG. 6 shows schematically a top view of a detailed section of a security element 80 having a two-dimensional relief grid 82 that consists of a plurality of grid elements 84 that connect with each other in both spatial directions. In the exemplary embodiment, the grid spacings are identical in the two spatial directions referred to below as the x— and y-direction and are, for example, 200 µm. Each grid element 84 forms a spherical Fresnel mirror structure that corresponds to a concave curvature of a spherical diverging Fresnel lens and is provided, for example, with a reflective aluminum metalization. In said embodiment, the individual relief elements 86 are formed by the coated ring-shaped zones of the diverging Fresnel lens and comprise curved reflection areas.

The relief grid 82 is combined with two print line grids having print lines 90, 92 of different colors and orientations. The print lines 90 of the first print line grid are formed having a dark hue, for example a dark blue and, except for the additional location-dependent modulation, run substantially in the same direction in the y-direction. The print lines 92 of the second print line grid are formed having a light hue, for example a translucent, luminous yellow and, except for the additional location-dependent modulation, run substantially in the same direction in the x-direction.

Figure 7:
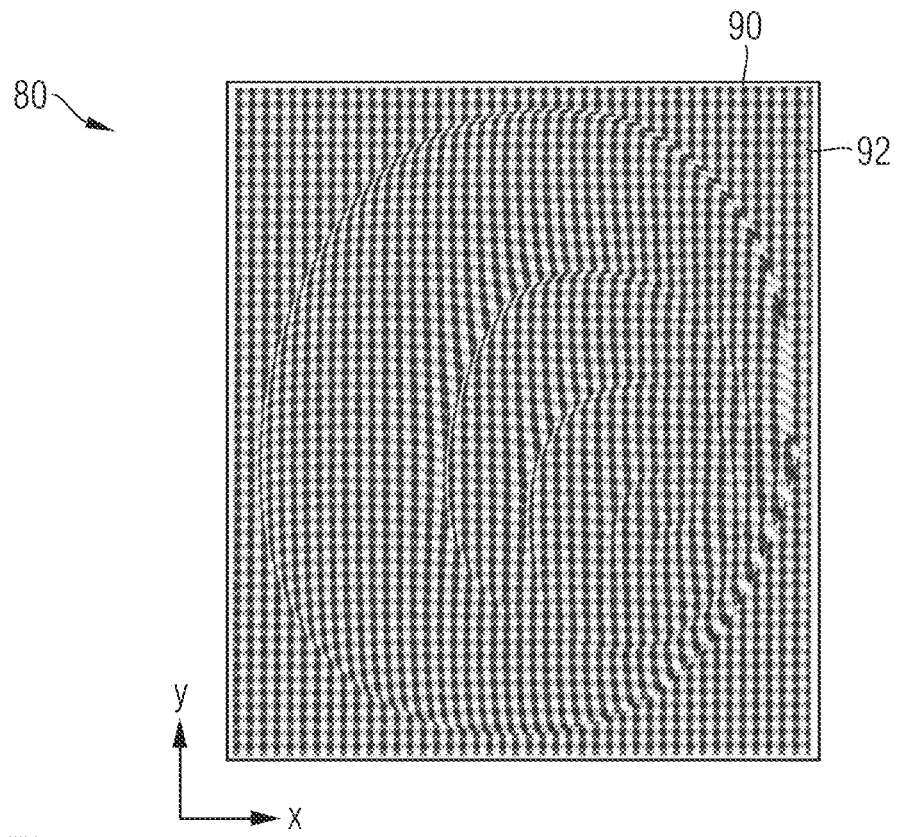

The modulation of the print lines 90, 92, which hardly has any effect in the detailed section in FIG. 6, is clearly perceptible in the top view of the entire area of the print line grid in FIG. 7. The two print line grids produce, like the line grid 40 in FIG. 4, the three-dimensional impression of the "snail shell" image motif 70 in FIG. 5. Such a line modulation at two angles of the relief grid proved to be particularly advantageous for depicting objects having a spatial effect. As shown in FIGS. 6 and 7, the two main directions of the print lines 90, 92 are coordinated with the geometry of the relief structure used and, in the square lattice geometry of the grid elements 84, run perpendicular to one another. In this way, a changed brightness of the visually visible spatial object results in each case when the security element is tilted across both main directions.

In a hexagonal lattice geometry, there could be used, for example, three line grids whose three main directions include in each case a 60° or 120° angle with one another.

Figure 8:
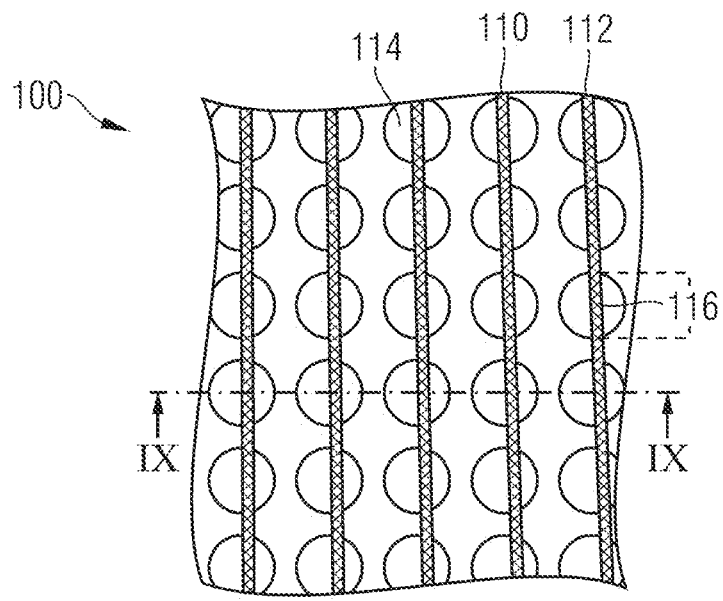
Figure 9:
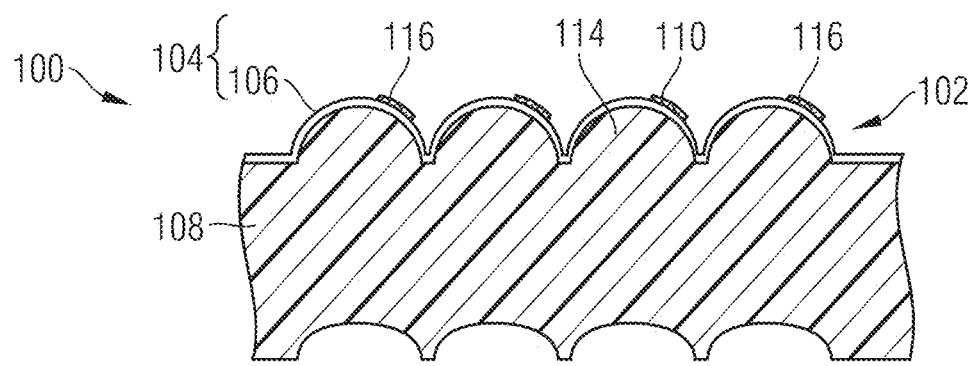

FIGS. 8 and 9 show a further exemplary embodiment of the present invention that differs from the exemplary embodiments described so far in the type of the relief grid. Here, FIG. 8 shows a top view of a section of the security element 100, and FIG. 9 a cross section through the security element along the line IX-IX in FIG. 8.

The security element 100 includes an optically variable structure that is formed by a combination of an embossing structure 102 and a coating 104. The coating 104 comprises a highly reflective background layer 106, for example a contiguous reflective silver layer having a high gloss value and that is imprinted on the banknote substrate 108 of the security element 100, for example in screen printing. The silver background layer 106 lends the security element 100 a principally metallically glossy appearance. In addition, an additional added functional value of the security element 100 can be produced by systematically interrupting the silver background layer, e.g. as a contour line shape, pattern or character. In another embodiment, the silver layer can also be lacking and be replaced by a glossy layer. Examples of suitable glossy layers include coated substrates such as glossy paper or lacquered paper. The glossy layer can also be formed, for example, by a glossy adhesion-promoting layer applied to a substrate surface with pigments or fillers (e.g. rutile-$TiO_2$) in screen printing.

In a further embodiment not shown here, the background layer can also be completely omit-ted. In this case, light, high-gloss substrate bodies, for example composed of coated and/or calendered paper, especially having increased filler content, or composed of paper having an increased white content, especially an increased titanium dioxide content, can advantageously be used.

Calendered paper, especially calendered paper having an increased proportion of fillers (e.g. $TiO_2$), has a considerably higher gloss value compared with uncalendered paper. For example, the gloss value of calendered cotton vellum paper is, on average, around 9, measured in accordance with DIN EN ISO 2813, DIN 54502, DIN EN ISO 8254-1, EN ISO 8254-2, while the gloss value of uncalendered cotton vellum paper is, on average, typically around 3. One manufacturer for suitable glossmeters is, for example, BYK Gardner (device name: micro-gloss).

If the security element 100 is integrated into a data carrier such as a banknote, the substrate 108 can also be the substrate of the value document itself.

On the background layer 106 is imprinted a colored, for example gold-colored, line grid 110 composed of a plurality of print lines 112 that run substantially in the same direction and that are location-dependently modulated. The line grid 110 can, for example, correspond to the line grid 40 in FIG. 4. Also multiple line grids that can also be arranged at an angle to one another, such as the line grid in FIG. 7, are possible.

The coating 104 formed by the background layer 106 and the line grid 110 is combined with an embossing structure 102 that consists of a two-dimensional square grid of embossing elements 114 that, in the exemplary embodiment, are formed by compressed hemispherical elevations. The elevations 114 have, for example, a base diameter $d_p$ of 250 µm and a height $h_p$ of 75 µm. As can be seen in FIG. 8, the grid spacing of the embossing element grid is somewhat larger than the base diameter of the embossing elements. The grid spacing of the embossing element grid and the average grid spacing of the line grid substantially match and are, for example, 300 µm.

Due to the matching values of the grid spacings, the coating 104 and the embossing structure 102 coact in such a way that, on one hand, due to the reflective effect of the background layer 106, every elevation 114 acts as a small convex mirror, and that, on the other hand, substantially on every elevation 114 lies a line segment 116 of a line 112 from the line grid 110. Occasionally, due to the modulation of the lines 112, it can happen that no line segment comes to lie on some elevations of the embossing structure.

Due to the location-dependent variation of the position of the line segments 116 on the embossing elements 114, the line segments 116 come to lie on regions of differing local slopes of the embossing elements. As can be seen in cross section in FIG. 9, the slope of the mirrored elevations 114 changes continuously from the left edge to the right edge such that, through a suitable positioning of the line segments 116 relative to the associated embossing element 114, the local reflection behavior of a curved area to be depicted in each case can be imitated.

The security element 100 can therefore be developed having an optical impression that corresponds to a three-dimensional object whose surface is given by the desired curved area.

The invention claimed is:

1. An optically variable security element for securing valuable articles, having:
   a relief grid having a plurality of relief elements arranged in a grid pattern, and
   at least one line grid arranged vertically above or below the relief grid and having a plurality of line elements that run substantially in a same direction and that are location-dependently modulated,
   the relief grid and the at least one line grid coacting to produce for a viewer, through the location-dependent modulation of the line elements with respect to a position of the relief elements of the relief grid, a surface that, with respect to an area of the security element, jumps out and/or back in the form of a three-dimensional image motif having a varying curvature.

2. The optically variable security element according to claim 1, wherein
   the relief grid is a one—or two-dimensional relief grid that is composed of a plurality of grid elements, that has a first grid spacing p below 500 µm in at least one spatial direction, and in which the grid elements are each formed from at least two relief elements that are directionally reflective in different directions,
   the at least one line grid having a second grid spacing q in said spatial direction, the second grid spacing q differing by less than one-fifth from the first grid spacing p, and/or the first grid spacing p and/or the second grid spacing q being location-dependently modulated, and
   a vertical spacing between the relief grid and the line grid being less than half of the grid spacing p.

3. The optically variable security element according to claim 2, wherein the relief grid is a one-dimensional grid that is composed of a plurality of elongated grid elements, that has said grid spacing p, and in which the grid elements are each formed from at least two elongated relief elements that are directionally reflective in different directions.

4. The optically variable security element according to claim 2, wherein the relief grid is a two-dimensional grid that is composed of a plurality of grid elements, that has said grid spacing p in a first spatial direction, and in which the grid elements are each formed from at least two relief elements that are directionally reflective in different directions, in that the grid elements are each formed from a circular or elliptical arrangement of a plurality of identical and/or different micromirrors or a spherical or elliptical Fresnel mirror structure.

5. The optically variable security element according to claim 4, wherein the reflective relief elements comprise one or more reflection areas, the reflective relief elements of each grid element being arranged and formed in such a way that slopes of the reflection areas reproduce a concave or convex curvature only in one spatial direction and are oriented irregularly or randomly in another spatial direction.

6. The optically variable security element according to claim 2, wherein the reflective relief elements of each grid element are arranged and developed in such a way that the grid element produces a reflection behavior of a concave or convex curvature.

7. The optically variable security element according to claim 2, wherein the first and/or second grid spacing is location-dependently modulated in that positions of the grid elements of the relief grid or of the line grid are given by a phase function (x,y) that depends on the position (x,y) of the grid element in the security element and whose function value indicates a deviation of the position of the grid element from position of a grid point in a periodic grid, normalized to a unit interval [0,1], and the phase function $\Phi$ (x,y) varying location dependently in such a way that, when viewed, the surface that, with respect to the area of the security element, jumps out and/or back in the form of a three-dimensional image motif is created.

8. The optically variable security element according to claim 2, wherein the grid elements are each formed from a plurality of elongated micro-mirrors or from a cylindrical Fresnel mirror structure.

9. The optically variable security element according to claim 2, wherein the grid elements are each formed from a circular or elliptical arrangement of a plurality of identical and/or different micromirrors or a spherical or elliptical Fresnel mirror structure.

10. The optically variable security element according to claim 1, wherein the security element includes an optically variable structure having an embossing structure and a coating,
    the coating comprising an imprinted line grid and, in addition, a highly reflective or glossy background layer, the imprinted line grid being formed by said line grid having the plurality of line elements that run substantially in the same direction and that are location-dependently modulated,
    the embossing structure comprising a two-dimensional grid of elevated or depressed embossing elements, the embossing structure forming said relief grid and the embossing elements forming said relief elements,
    the coating and the embossing structure being combined in such a way that substantially on every embossing element lies at least one line segment of a line in the line grid, and
    at least one of the parameters 'position of the line segment on the embossing element,' 'orientation of the line segment on the embossing element' and 'form of the line segment' varying location dependently across a dimension of the optically variable structure such that, when viewed, the surface that, with respect to the area of the security element, jumps out and/or back in the form of a three-dimensional image motif is created.

11. The optically variable security element according to claim 10, wherein, when a highly reflective background layer is present, said layer is formed by a metallically glossy foil or by a metallically glossy printing layer, with each embossing element acting, through the highly reflective background layer, as a concave or convex mirror.

12. The optically variable security element according to claim 11, wherein, the metallically glossy foil comprises a silver, bronze, copper, gold or metallic foil.

13. The optically variable security element according to claim 11, wherein the metallically glossy printing layer comprises a silver print layer.

14. The optically variable security element according to claim 10, wherein a background that contrasts with the imprinted line grid is formed by the surface of the substrate itself.

15. The optically variable security element according to claim 14, wherein the background is formed by calendered paper, coated paper and/or high-density paper.

16. The optically variable security element according to claim 10, wherein the embossing elements are formed by elevated or depressed round structures, by compressed hemispherical structures or calottes having a circular or elliptical base area.

17. The optically variable security element according to claim 10, wherein a position of a line segment on an embossing element is given in each case by a phase function (x,y) that depends on a position (x,y) of the embossing element in the optically variable structure and whose function value indicates a relative position of the line segment on the embossing element perpendicular to a longitudinal dimension of the line segment, normalized to a unit interval [0, 1], and the phase function (x,y) varying location dependently in such a way that, when viewed, the surface that, with respect to the area of the security element, jumps out and/or back in the form of a three-dimensional image motif is created.

18. The optically variable security element according to claim 1, wherein two or more line grids arranged vertically above or below the relief grid are provided, lines of different line grids being applied with different inks.

19. The optically variable security element according to claim 18, wherein line grids that run substantially in a same direction each have a predominant direction defined by the line direction, and the directions of the two or more line grids together include an angle of 0, 60°, 90°, 120° or 240°.

20. The optically variable security element according to claim 18, wherein the different inks comprise a lighter, translucent ink and a darker, covering ink.

21. The optically variable security element according to claim 1, wherein a line width of the line elements changes along a longitudinal dimension of the line elements.

22. The optically variable security element according to claim 21, wherein the line width of the line elements increases, decreases or is modulated on one or two sides along the longitudinal dimension of the line elements.

23. The optically variable security element according to claim 1, wherein the relief grid and the line grid coact to produce, through the location-dependent modulation of the line elements, a change in brightness or change in color of the three-dimensional image motif when a viewing angle is changed.

24. The optically variable security element according to claim 1, wherein the relief grid and the line grid coact to produce, through the location-dependent modulation of the line elements, an apparent movement of sub-regions of the three-dimensional image motif or a change in the perspective appearance of the three-dimensional image motif when a viewing angle is changed.

25. The optically variable security element according to claim 1, wherein the relief grid comprises a first and a second sub-region, the two sub-regions each being optically perceptible as jumping out and/or back and each of the two sub-regions conveying a haptically detectable impression, the optically perceptible impression and the haptically detectable impression of the first sub-region matching, and the optically perceptible impression and the haptically detectable impression of the second sub-region not matching.

26. A data carrier or object having a security element according to claim 1.

* * * * *